(12) United States Patent
Wilson

(10) Patent No.: US 8,576,253 B2
(45) Date of Patent: Nov. 5, 2013

(54) GRASP SIMULATION OF A VIRTUAL OBJECT

(75) Inventor: Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 12/767,814

(22) Filed: Apr. 27, 2010

(65) Prior Publication Data

US 2011/0261083 A1  Oct. 27, 2011

(51) Int. Cl.
*G06T 15/00* (2011.01)
*G06G 5/00* (2006.01)
*G06F 3/048* (2013.01)

(52) U.S. Cl.
USPC ............ 345/676; 345/419; 345/619; 715/862

(58) Field of Classification Search
USPC ........ 345/173, 419, 619, 67, 676; 463/30–33; 715/700–701, 757, 862, 863
See application file for complete search history.

(56) References Cited

U.S. PATENT DOCUMENTS

| | | | |
|---|---|---|---|
| 5,482,051 A | 1/1996 | Reddy et al. | |
| 5,483,261 A * | 1/1996 | Yasutake | 345/173 |
| 6,028,593 A | 2/2000 | Rosenberg et al. | |
| 6,714,213 B1 | 3/2004 | Lithicum et al. | |
| 7,050,955 B1 * | 5/2006 | Carmel et al. | 345/419 |
| 7,084,884 B1 * | 8/2006 | Nelson et al. | 345/619 |
| 7,324,085 B2 * | 1/2008 | Balakrishnan et al. | 345/157 |
| 7,907,124 B2 * | 3/2011 | Hillis et al. | 345/173 |
| 8,154,524 B2 * | 4/2012 | Wilson et al. | 345/173 |
| 8,289,316 B1 * | 10/2012 | Reisman et al. | 345/419 |
| 2008/0180406 A1 * | 7/2008 | Han et al. | 345/173 |
| 2008/0293488 A1 * | 11/2008 | Cheng et al. | 463/31 |
| 2009/0144664 A1 * | 6/2009 | Kramer et al. | 715/852 |
| 2010/0011281 A1 * | 1/2010 | Hong et al. | 715/232 |
| 2011/0164029 A1 * | 7/2011 | King et al. | 345/419 |

FOREIGN PATENT DOCUMENTS

WO          9616389 A1      5/1996

OTHER PUBLICATIONS

Otmar Hilliges Bringing the Physical to the Digital: A New Model for Tabletop Interaction Jan. 2009, Ludwig Maximilians University Munich, Dissertation, Chapters 7 and 9.*

Ronan Boulic, Serge Rezzonico, Daniel Thalmann Multi-Finger Manipulation of Virtual Objects Jul. 1996, Proc. of ACM Symposium on Virtual Reality Software and Technology, pp. 67-74.*

Grigore Burdea, Edward Roskos, Deborah Silver, Francois Thibaud, Robert Wolpov A Distributed Virtual Environment with Dextrous Force Feedback Mar. 1992, Proceedings of Interface to Real and Virtual Worlds Conference, pp. 255-265.*

(Continued)

*Primary Examiner* — Aaron M Richer
*Assistant Examiner* — Michael J Cobb
(74) *Attorney, Agent, or Firm* — International IP Law Group, PLLC

(57) ABSTRACT

The claimed subject matter provides a system and/or a method for simulating grasping of a virtual object. Virtual 3D objects receive simulated user input forces via a 2D input surface adjacent to them. An exemplary method comprises receiving a user input corresponding to a grasping gesture that includes at least two simulated contacts with the virtual object. The grasping gesture is modeled as a simulation of frictional forces on the virtual object. A simulated physical effect on the virtual object by the frictional forces is determined. At least one microprocessor is used to display a visual image of the virtual object moving according to the simulated physical effect.

17 Claims, 10 Drawing Sheets

300

(56) References Cited

OTHER PUBLICATIONS

Emmanuel Dubois, Luciana Nedel, Carla M. Dal Sasso. Freitas, Liliane Jacon Beyond User Experimentation: Notational-Based Systematic Evaluation of Interaction Techniques in Virtual Reality Environments 2005, Virtual Reality, vol. 8(2), pp. 118-128.*

Mark Hancock, Sheelagh Carpendale, Andrew Cockburn, Shallow-Depth 3D Interaction: Design and Evaluation of One-Two- and Three-Touch Techniques, 2007, CHI '07 Proceedings of the SIGCHI Conference on Human Factors in Computing Systems, p. 1147-1156, DOI: 10.1145/1240624.1240798.*

Mark Hancock, Thomas ten Cate, Sheelagh Carpendale, Sticky Tools: Full 6DOF Force-Based Interaction for Multi-Touch Tables, 2009, ITS '09 Proceedings of the ACM International Conference on Interactive Tabletops and Surfaces, p. 133-140, DOI: 10.1145/1731903.1731930.*

Andrew D. Wilson, Simulating Grasping Behavior on an Imaging Interactive Surface, 2009, Proceedings of the ACM International Conference on Interactive Tabletops and Surfaces, pp. 125-132.*

Pramath Raj Sinha, A Contact Stress Model for Determining Forces in an Equilibrium Grasp, 1989, University of Pennsylvania, Master Thesis, Chapters 1 and 2.*

Sinha, et al., "A Contact Stress Model for Multifingered Grasps of Rough Objects", Retrieved at << http://ieeexplore.ieee.org/stamp/stamp.jsp?tp=&arnumber=127235&userType=inst >>, IEEE Transactions on Robotics and Automation, vol. 8, No. 1, Feb. 1992, pp. 7-22.

Douville, et al., "Task Level Object Grasping for Simulated Agents", Retrieved at << http://repository.upenn.edu/cgi/viewcontent.cgi?article=1080&context=hms >>, 1996, pp. 1-24.

Moussa, Medhat A., "Combining Expert Neural Networks Using Reinforcement Feedback for Learning Primitive Grasping Behavior", Retrieved at << http://ieeexplore.ieee.org/stamp/stamp.jsp?tp=&arnumber=1296690 >>, IEEE Transactions on Neural Networks, vol. 15, No. 3, May 2004, pp. 629-638.

Sukthankar, et al., "Virtual Reality of "Squeezing" Using Hand EMG Controlled Finite Element Models", Retrieved at << http://ieeexplore.ieee.org/stamp/stamp.jsp?tp=&arnumber=978960&userType=inst >>, IEEE 1993, 1993, pp. 972.

Maekawa, et al., "Haptic Display for Object Grasping and Manipulating in Virtual Environment", Retrieved at << http:// www.cs.utah.edu~jmh/Papers/Maekawa_ICRA98.pdf >>, Proceedings of the 1998 IEEE International Conference on Robotics & Automation, May 1998, pp. 2566-2573.

Cao, et al., "ShapeTouch: Leveraging Contact Shape on Interactive Surfaces", Retrieved at << http://www.cs.toronto.edu/~caox/tabletop2008_shapetouch.pdf >>, Proceedings of Tabletop 2008, IEEE International Workshop on Horizontal Interactive Human Computer System, 2008, pp. 139-146.

Chang, et al., "A Linear-Time Component Labeling Algorithm Using Contour Tracing Technique", Retrieved at << http://www.iis.sinica.edu.tw/~fchang/paper/component_labeling_cviu.pdf >>, Computer Vision and Image Understanding, vol. 93, No. 2, Feb. 2004, pp. 1-20.

Fröhlich, et al., "Physically-Based Manipulation on the Responsive Workbench", Retrieved at << http://citeseerx.ist.psu.edu/viewdoc/download?doi=10.1.1.28.4050&rep=rep1&type=pdf >>, VR, Proceedings of the IEEE Virtual Reality Conference, Mar. 18-22, 2000, pp. 7.

Han, Jefferson Y., "Low-Cost Multi-Touch Sensing Through Frustrated Total Internal Reflection", Retrieved at << http://alereimondo.no-ip.org/MultiTouch/uploads/36/Han_UIST2005.pdf >>, Symposium on User Interface Software and Technology, Proceedings of the 18th annual ACM symposium on User interface software and technology, Oct. 23-26, 2005, pp. 115-118.

Hilliges, et al., "Interactions in the Air: Adding Further Depth to Interactive Tabletops", Retrieved at << http://research.microsoft.com/en-us/um/people/awilson/publications/hilligesuist2009/p139-hilliges.pdf >>, Symposium on User Interface Software and Technology, Proceedings of the 22nd annual ACM symposium on User interface software and technology, Oct. 4-7, 2009, pp. 139-148.

Jerez, et al., "Newton Physics Engine", Retrieved at << http://www.newtondynamics.com >>, Retrieved Date: Feb. 23, 2010, pp. 2.

Kruger, et al., "Fluid Integration of Rotation and Translation", Retrieved at << http://janus.cs.utwente.nl/~kosterj/thesis/p601-kruger.pdf >>, Conference on Human Factors in Computing Systems, Proceedings of the SIGCHI conference on Human factors in computing systems, Apr. 2-7, 2005, pp. 601-610.

"Microsoft Surface", Retrieved at http://www.surface.com >>, Retrieved Date: Feb. 24, 2010, pp. 1.

Wilson, Andrew D., "TouchLight: An Imaging Touch Screen and Display for Gesture-Based Interaction", Retrieved at << http://research.microsoft.com/en-us/um/people/awilson/publications/WilsonICMI2004/ICMI%202004%20TouchLight.pdf >>, International Conference on Multimodal Interfaces, Proceedings of the 6th international conference on Multimodal interfaces, Oct. 13-15, 2004, pp. 8.

Wilson, Andrew D., "PlayAnywhere: A Compact Interactive Tabletop Projection-Vision System", Retrieved at http://research.microsoft.com/en-us/um/people/awilson/publications/wilsonuist2005/wilson%20playanywhere%20uist%202005.pdf >>, Symposium on User Interface Software and Technology, Proceedings of the 18th annual ACM symposium on User interface software and technology, Oct. 23-26, 2005, pp. 10.

Wilson, Andrew D., "Robust Computer Vision-Based Detection of Pinching for One and Two-Handed Gesture Input", Retrieved at << http://delivery.acm.org/10.1145/1170000/1166292/p255-wilson.pdf?key1=1166292&key2=2700104611&coll=&dl=ACM&CFID=15151515&CFTOKEN=6184618 >>, Symposium on User Interface Software and Technology, Proceedings of the 19th annual ACM symposium on User interface software and technology, Oct. 15-18, 2006, pp. 255-258.

Wilson, Andrew D., "Depth-Sensing Video Cameras for 3D Tangible Interaction", Retrieved at http://research.microsoft.com/en-us/um/people/awilson/publications/WilsonTabletop2007/Wilson-Depth%20Sensing.pdf >>, in Proceedings of Second Annual IEEE International Workshop on Horizontal Interactive Human-Computer Systems, Tabletop 2007, Oct. 10-12, 2007, pp. 4.

Wilson, et al., "Bringing Physics to the Surface", Retrieved at << http://www.medien.ifi.lmu.de/pubdb/publications/pub/hilliges2008uist/hilliges2008uist.pdf >>, Symposium on User Interface Software and Technology, Proceedings of the 21st annual ACM symposium on User interface software and technology, Oct. 19-22, 2008, pp. 67-76.

* cited by examiner

100

200

300

400

GRASP SIMULATION OF A VIRTUAL OBJECT

BACKGROUND

Electronic devices such as computers, personal digital assistants, mobile phones, video games and the like may employ a wide range of input mechanisms to allow a user to perform data entry, or to access and manipulate data. Examples of input mechanisms include the keyboard, mouse, or other pointing device (e.g., a stylus). Another input mechanism that is becoming increasingly important is the touch screen. In general, a touch screen is an input device that allows users to operate an electronic device by simply touching a display screen.

Of the various input techniques and/or methods, surface computing using a touch screen can enable users to manipulate data with physical contact or interaction. For example, surface computing technology can be employed to allow a user to move, edit, or interact with a virtual object using his or her hands. However, as the amount of data interaction and abilities increase with surface computing or surface technologies, users typically prefer an interaction with data or virtual objects representing data that is substantially similar to the user's interaction with objects in the real world.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to simulating grasping of a virtual object. Virtual three-dimensional (3D) objects receive simulated user input corresponding to a grasping gesture via a two-dimensional (2D) input surface adjacent to the virtual objects. The grasping gesture is modeled as a simulation of frictional forces on the virtual object. After the virtual object is grasped, it may be moved according to the modeled physical effect of the frictional forces. The frictional forces may be modeled as persistent particle proxies. Each of the persistent particle proxies represents the impact of a single small force on the virtual object. Persistent particle proxies are effective in the simulation of grasping virtual objects because they facilitate the exertion of simulated normal forces on the sides of the virtual object.

One exemplary implementation relates to a system that facilitates a simulation of an interaction between an input object and a virtual object. The system receives and processes multiple simulated contacts by an input object (such as multiple fingers of a user) to simulate grasping the virtual object. A visualization of the virtual object may be provided in a region adjacent to a touch screen. A physics engine is used to model detected inputs as persistent particle proxy objects. Using persistent particle proxy objects, a simulation of an interaction between the input object and the virtual object is performed. The simulation takes into account physics-based principles such as force, mass, velocity or friction.

An exemplary method simulates the motion of a virtual object. A motion simulation may be performed by depicting a position of the virtual object at successive points in time. Each representation of the position of the object at a particular time may be referred to herein as a frame. To begin a simulation, a first user input that includes at least two simulated contacts with a virtual object is received. The two simulated contacts represent a user's intention to grasp the virtual object. Persistent particle proxies are used to define a position of the object in a first frame of the simulation. At a second point in time, a second user input that includes at least two simulated contacts with the virtual object is received. Persistent particle proxies are used to define a second frame of the simulation based on the second user input. The second user input is modeled by determining which persistent particle proxies are common to the first user input, which persistent particle proxies have been added and which persistent particle proxies have been removed. Motion of the virtual object may be simulated by changing the position of the virtual object in a visualization according to a simulation of a difference in physical forces represented by the second user input relative to the first user input.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
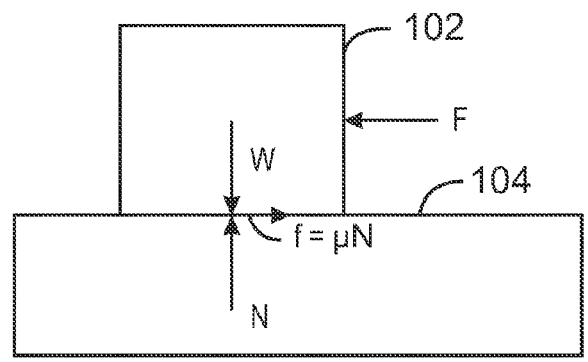
FIG. 1 is a diagram that shows the role of friction forces in the process of grasping.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "manipulator" and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media. Computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Moreover, computer readable media include both propagating signals and computer readable storage media. Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation relates to a touch screen computer system that allows a user to perform complex operations such as effectively simulating the grasping of virtual objects. As set forth herein, the subject innovation makes it possible to move or "hold onto" a virtual object by "squeezing" the virtual object with multiple fingers placed around it. Exemplary embodiments improve the performance in systems that allow a user to manipulate a 3D virtual object using a 2D input screen. In contrast, known systems limit users to simulated manipulation of a virtual object by modeling the application of friction forces on its top faces and colliding with its sides.

The subject innovation relates to simulating grasping behavior on an imaging interactive surface such as a commercially available product known as Microsoft Surface™. In particular, exemplary embodiments relate to a contour model of touch contact shape, and how these contours may be represented in a real-time physics simulation in a way that allows more realistic grasping behavior.

Exemplary embodiments of the subject innovation may employ many small rigid bodies ("particle proxies") to approximate touch contact shape and to model the application of physical forces to a virtual object. Moreover, exemplary embodiments employ persistent particle proxies to simulate grasping behavior via a user interface.

The particle proxy approach employs representations of many small rigid bodies as proxies for a larger input object (a grasping hand, for example) to provide a real-time physics simulation of an interaction with a virtual object. The rigid bodies are termed "proxies" because they are positioned to closely approximate the shape of the input object that makes simulated contact with the virtual object. The effect of all of the particle proxies taken together is representative of a simulated interaction between the input object and the virtual object. The particle proxies are moved to match the local motion of the input object, which may be detected by an input monitoring device. The movement of particle proxies is achieved by applying a force of the exact magnitude and direction to effect the movement of each particle proxy. Because each particle proxy is modeled as a rigid body in the physics simulation, it participates in collision and friction calculations like any other rigid body.

In one exemplary embodiment of the subject innovation, a virtual object such as a cube can be displayed at a location that is on an opposite side of a touch screen interface. A user can use inputs made by touching the surface of a touch screen to manipulate (e.g., grasp, move, delete, shrink, enlarge, rotate, etc.) the virtual object.

In another example, a bolt and a nut can be graphically represented and displayed such that a user can virtually grasp and interact with either. In accordance with the claimed subject matter, a physics engine can apply or model physics-based quantities (e.g., forces, torque, gravity, mass, velocity, etc.) to user interactions with the virtual bolt and nut. Thus, a user can grasp the nut and attempt to screw it onto the bolt with real-world physics quantities associated therewith. Moreover, the visual representations of the nut and bolt respond as if real-world physics-based quantities are being applied to them.

The subject innovation can allow simulated grasping interactions to have real-world physics-based characteristics associated with properties such as force, mass, velocity, friction, etc. of a virtual object. By simulating grasping behavior at the basic level of concepts such as forces and friction, the subject innovation may allow users to exploit the variety of grasping strategies that are familiar in the real world, and may allow system designers to avoid the need to program multiple interactions in an ad hoc fashion.

Now turning to the figures, FIG. 1 is a diagram 100 that shows the role of friction forces in the process of grasping. The diagram 100 shows an object 102 having a weight W. The object 102 is disposed upon a surface 104. An external force F applied to the object 102 is opposed by a friction force f. Moreover, the friction force f is proportional to a normal force N. Because friction forces f are proportional to the normal force, it is possible to maintain the grip of a slippery object by squeezing it more firmly. Similarly, an object may fall out of grasp if the grip is lessened.

A significant feature of grasping objects with hands is the way that multiple fingers and the soft flesh of the hand conform to the shape of the grasped object. This can make it easier to achieve a stable grasp. In contrast, grasping a smooth object by the tips of two pencils could be difficult.

With respect to the present innovation, simulated grasping may be considered as the simulated application of multiple persistent contacts on the sides of a virtual object. Each of these persistent contacts imparts a perpendicular or normal force relative to the surface of the virtual object. In the case where the vector sum of all such normal forces is zero, "mechanical equilibrium" is obtained and the object does not accelerate. If the contacts move, the object may be caused to move to restore mechanical equilibrium, as when, for example, an object is rotated while grasped.

As explained herein, the subject innovation employs persistent particle proxies that persist from frame to frame to simulate grasping behavior. It is thus possible to move or "hold onto" a virtual or digital object by "squeezing" the virtual object with multiple fingers placed around it. In an exemplary embodiment, the use of persistent particle proxies enables simulated grasping behavior. This is in contrast to mere manipulation of a virtual object by applying friction forces on its top faces and colliding other objects with its sides. Because particle proxies according to the subject innovation persist from frame to frame, each particle proxy will have the same or similar height as its predecessor. Accordingly, particle proxies tend to rest in contact with the side of a virtual object rather than appear on the top of the object. In this way, the particle proxies are allowed to conform to the shape of the object much as a real hand might.

The subject innovation may provide several new grasping interactions. Moreover, an exemplary embodiment may enable a simulation of grasping virtual objects from the side and turning them in place. Grasping from the side can translate the object by friction forces on the side of the object. Collision and friction-based interactions are supported. Moreover, the same friction forces may prevent a colliding object from moving the virtual object. Likewise, a "lighter" squeeze may also allow the object to move. In a similar manner, a finger engaging the top of a virtual object may not impart enough friction force to move the virtual object. In such a case, the finger will appear to slide off the top of the virtual object.

Figure 2:
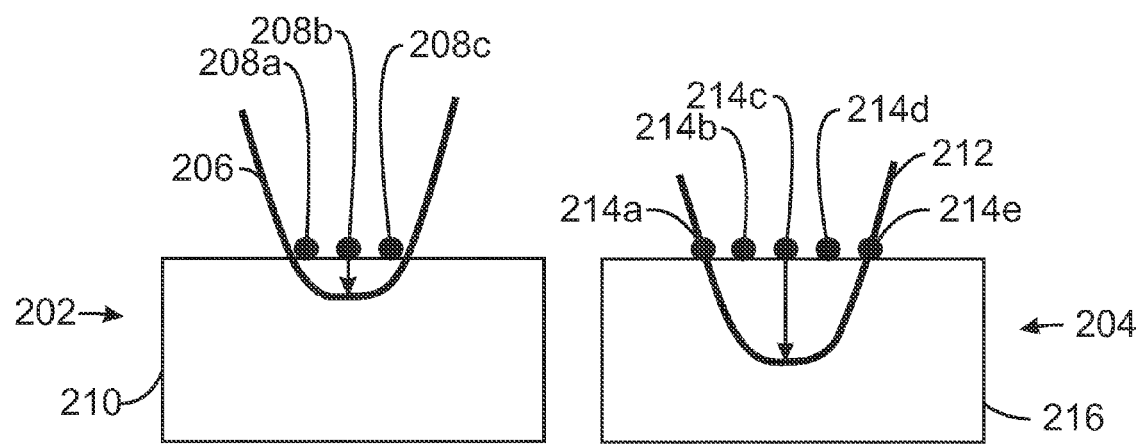
FIG. 2 is a diagram that shows the application of two simulated forces of different magnitudes on a virtual object.

FIG. 2 is a diagram 200 that shows the application of two simulated forces of different magnitudes on a virtual object. In an exemplary embodiment, the virtual objects represented in FIG. 2 receive simulated input forces via a 2D input surface (not shown in FIG. 2) adjacent to them. The simulated input forces may be applied to kinematically position a particle proxy used to simulate physics-based effects on a virtual object in the (x,y) plane.

The diagram 200 includes a left panel 202 and a right panel 204. The left panel 202 depicts the application of a force of a first magnitude, represented by a contour 206, to a virtual object 210. The right panel 204 depicts the application of a force of a second magnitude, represented by a contour 212, to a virtual object 216. With regard to the left panel 202, the contour 206 represents input from an input object such as a user's fingers on a touch screen (not shown in FIG. 2). For purposes of physics modeling, the force represented by the contour 206 may be modeled by a plurality of particle proxies 208a, 208b and 208c. The simulated force represented by the contour 206 may be proportional to a surface area of a touch screen input device that is in direct contact with the finger of a user or other object used to apply force to the virtual object 210. In the left panel 202, the contour 206 extends only slightly into the virtual object 210. The slight incursion of the contour 206 into the virtual object 210 may be representative of a force that, when accompanied by a second opposing force (not represented in the left panel 202), is just sufficient to allow grasping of the virtual object 210.

With regard to the right panel 204, the magnitude of the force represented by the contour 212 is greater than the magnitude of the force represented by the contour 206 in the left panel 202 of the diagram 200. For purposes of physics modeling, the force represented by the contour 212 may be modeled by a plurality of particle proxies 214a, 214b, 214c, 214c and 214d. The larger number of particle proxies is indicative of a larger grasping area, effectively modeling the increased grasping force applied by a user's fingers. The total force applied to a virtual object is a function of both (a) the number of particles (grasping area) and (b) the grasping depth (e.g., incursion within a virtual object) of a simulated grasping gesture. In the right panel 204, the contour 212 represents an incursion that extends substantially into a virtual object 216. The substantial incursion of the contour 212 into the virtual object 216 may be modeled as a force that, when accompanied by a second opposing force (not represented in the right panel 204), is large enough to allow firm grasping of the virtual object 216.

When simulating the grasping of virtual objects, there is no actual restorative force opposing the grasping force imparted by, for example, a user's fingers. Consequently, there is nothing to stop the user from penetrating the object by an amount that cannot be reasonably modeled by the conforming behavior of particle proxy contours used to model touches of the virtual objects. For example, users could bring their fingertips together, which would indicate compression of the virtual object to a zero dimension. Because this situation is not physically possible, it may be desirable to model applied forces such that they vary continuously with varying amounts of penetration or incursion, so that the subsequent simulated behavior of the virtual object is at least predictable.

In an exemplary embodiment, the forces are proportional to the displacement of the particle proxy from its matched input contour point. Thus, the normal force of a particle proxy resting on the side of the virtual object will increase as the contact moves further inside the object. Moreover, exemplary embodiments of the subject innovation may model the magnitude of a force on a virtual object as proportional to the distance of an incursion within the interior of virtual object. The increase in magnitude of an applied force results in an attendant increase in friction forces, which allows the user to "press harder" or "squeeze" an object to maintain a firmer grip.

It may be possible to support top friction forces and grasping by establishing a limit on the penetration that grasping supports. For example, an input contour representative of a simulated contact with a virtual object that appears near the middle of the virtual object (or is completely contained by the virtual object) could arbitrarily be placed on a top face of the virtual object because placing the object further within the boundary of the virtual object would imply an unrealistic amount of penetration.

The need to consider object penetration when modeling grasping behavior arises from the fact that a 2D sensor such as a surface is used to interact with a 3D environment that includes a virtual 3D object. Moreover, a 2D sensor may be used to infer (rather than directly measure) the height of a contact with a virtual object in the z– direction.

Alternatively, exemplary embodiments may employ 3D sensing technology, in which the height of a contact in the z– direction may in fact be directly measured. For example, interactions may be shown using a range sensing camera and a co-located projected image. In addition, interactions above interactive surfaces, using two hardware configurations that allow sensing the space above the display, including a range sensing camera may be examined. Moreover, the use of the persistent particle proxy technique as explained herein can be extended to work with 3D input devices such as range sensing cameras. One consideration may be in extending the point motion estimation process to work with meshes (data structures that represent a 3D space) rather than contours, which represent a 2D area.

In one exemplary embodiment, each particle proxy of the groups of particle proxies 208 and 214 may be modeled to be spherical. Spherical particle proxies are relatively easy to work with, but can sometimes lead to unusual or unexpected results with certain kinds of 3D geometry. For example, particle proxies used to perform simulations as described herein are typically modeled as being very small relative to virtual objects they act upon. Accordingly, sliding an input object into a virtual ball may result in a simulation in which the much smaller particle proxies move under the ball until they finally hit the underside of the ball near the point at which it contacts the ground floor, rather than contacting the "side" of the ball. It may be desirable to employ particle proxies that have greater height in the z– direction to avoid this problem. Proxies in the shape of long capsules, having a relatively long height in the z– direction, are one example of a proxy geometry that may provide more realistic modeling results relative to very small spherical proxies.

However, capsule-shaped particle proxies and spherical particle proxies may contact a virtual object at a single point. In contrast, the height of the point of contact in the z– direction when grasping a virtual object according to the subject innovation may vary throughout the grasping contours, thus causing simulated forces that may cause the virtual object to rotate or flip over unexpectedly. To alleviate this problem, it may be desirable to employ the stacking of multiple spherical particle proxies at each point in the grasping contour. The use of stacked particle proxies is shown in FIG. 3.

Figure 3:
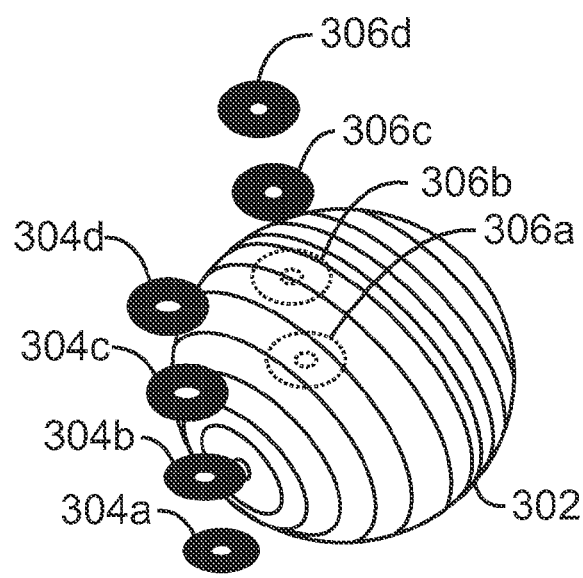
FIG. 3 is a diagram showing stacked particles generated from two simulated contacts with a virtual object.

FIG. 3 is a diagram 300 showing stacked particle proxies generated from two simulated contacts with a virtual object. In the diagram 300, a virtual object 302 is shown. The virtual object 302 is in the form of a sphere. A first stack 304 of particle proxies is shown as a column of annular shapes. The first stack 304 comprises particle proxies 304a, 304b, 304c and 304d.

A second stack 306 of particle proxies is shown to represent a force in opposition to the force represented by the first stack. The second stack 306 comprises particle proxies 306a, 306b, 306c and 306d. In FIG. 3, the particle proxies 306a and 306b are shown with dashed lines because they would otherwise be obscured by the virtual object 302. In an exemplary embodiment, the first stack 304 and the second stack 306 may be generated responsive to a grasping gesture made on a 2D surface located above the virtual object 302. The location of the bottommost particle proxies 304a, 306a may be vertically aligned with a higher particle proxy that is modeled as being in contact with the virtual object 302. In addition, the higher particle proxies may be modeled to lie at fixed heights.

Figure 4:
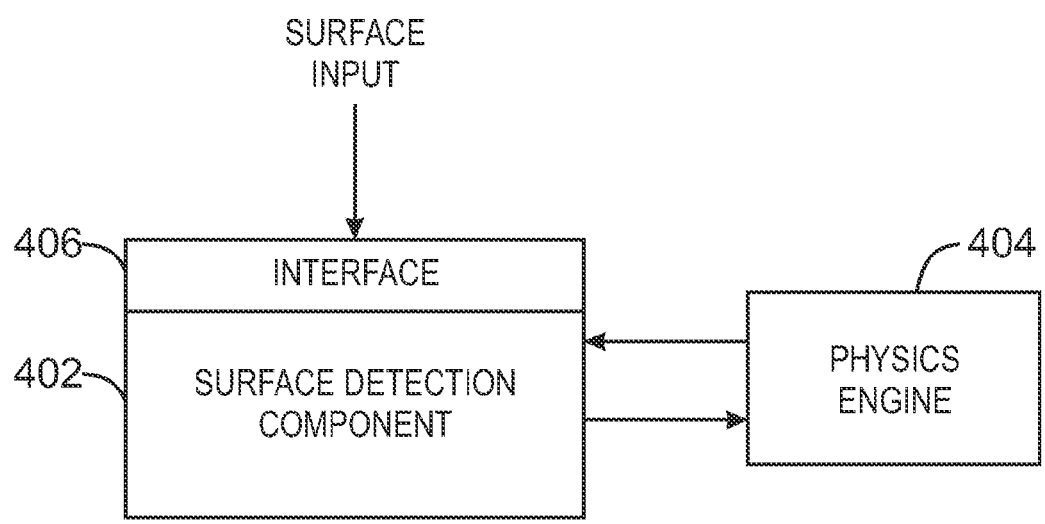
FIG. 4 is a block diagram of an exemplary system that facilitates the simulation of grasping virtual objects.

FIG. 4 is a block diagram of an exemplary system 400 that facilitates the simulation of grasping virtual objects. The system 400 can include a surface detection component 402 that can detect a surface input via an interface component 406 in order to enable an interaction with a virtual object. The user interface may comprise, for example, a touch-sensitive display screen or the like.

Imaging interactive surfaces such as Microsoft Surface™, frustrated total internal reflection (FTIR)-based systems and others use video cameras and computer vision techniques to obtain detailed information about the shape of the fingers, hands and other objects in contact with the interface component 406. According to the subject innovation, this information may be used to increase the realism of simulated grasping behavior of digital or virtual objects.

The system 400 can further include a physics engine 404 that can apply physics-based principles to a simulated interaction with a virtual object while hiding computational complexity. Examples of physics-based properties that may be modeled include force, mass, velocity, friction or the like. Moreover, the physics engine 404 can provide realistic simulations in connection with the modeling of movement of a virtual object as described herein. In one implementation, a known physics engine such as the Newton physics simulator, version 1.56, available from http:/www.newtondynamics.com, may be used as the physics engine 404. In such an implementation, generation of persistent particle proxies as described herein may be performed external to the physics engine 404. Information regarding the persistent particle proxies may then be provided to the physics engine 404. Alternatively, the generation of persistent particle proxies may be incorporated into the physics engine 404, as shown and described with reference to FIG. 5.

Figure 5:
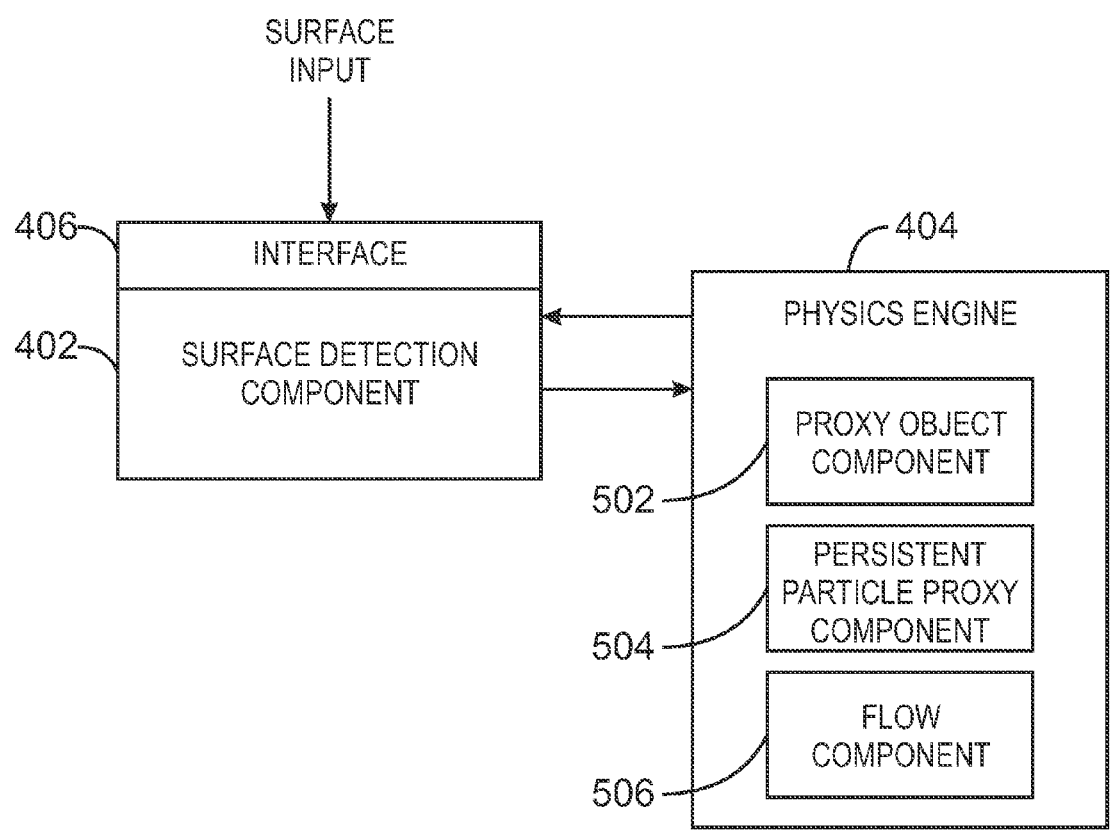
FIG. 5 is a block diagram of an exemplary system 500 that facilitates modeling physics-based principles using persistent particle proxies in a simulated grasping process.

FIG. 5 is a block diagram of an exemplary system 500 that facilitates modeling physics-based principles using persistent particle proxies in a simulated grasping process. Moreover, the system 500 may be employed to simulate grasping behavior according to the subject innovation. The physics engine 404 of the system 500 can include a proxy object component 502 that can incorporate the surface input into a physics simulation by creating a proxy object for each surface input detected. The proxy object component 502 can generate proxy objects or proxies in accordance with the subject innovation.

The physics engine 404 can further include a persistent particle proxy component 504 that models a shape of the surface input using a plurality of persistent particle proxies placed along a contour of the surface input. The use of particle proxies that are persistent (i.e., "persistent particle proxies") allows an exemplary embodiment of the subject innovation to realistically simulate grasping a virtual object. As explained in detail herein, persistent particle proxies persist from one frame of a simulation to a successive frame. Particle proxies that are present in a successive frame of a simulation may employ information about physics-based movement (e.g., the position of the particle) imparted to them in a previous frame of the simulation. Thus, persistent particle proxies facilitate more realistic simulation of grasping behavior by avoiding the restarting of proxy positioning for each frame of a simulation.

Persistent particle proxies that are preserved frame to frame are an alternative to creating a complete set of particle proxies for every frame of a simulation (non-persistent particle proxies). According to the subject innovation, the use of persistent particle proxies has the advantage of allowing particle proxies to rest on the side of an object even when the corresponding contact has moved deep within the object. A collection of such points distributed along the contour of an input contact can thus conform to the shape of the object to impart normal and friction forces needed for grasping. As explained herein, the magnitude of the normal forces and friction forces may increase as an input object moves within the boundary of the virtual object.

Non-persistent particle proxies have proven ineffective for purposes of simulating grasping a virtual object. This is because of the instantaneous nature of non-persistent particle proxies on a frame by frame basis. Consider two finger contacts closing around a virtual object at rest using non-persistent particle proxies. Each finger is represented by a cluster of particle proxies, each created, positioned, moved, and destroyed every frame. At some point, some particle proxies will collide with the object and the object will move in response. Eventually, particle proxies will be in contact on both sides of the object, and the object will have nowhere to go. At this moment, the object might be considered to be under grasping control. However, it is very likely that the user, in the absence of tactile feedback from the virtual object, will continue to move their fingers together. Shortly thereafter, the subsequently created non-persistent particle proxies will be placed on top of the object.

The net result of the use of non-persistent particle proxies to simulate grasping is that, while the user may be able to place particle proxies that are in contact with the side of objects, these particle proxies will never exert any significant normal force on the side of the object (and, subsequently, friction forces) that lead to true grasping behavior. This is true because non-persistent particle proxies are recreated at the start of each frame in a simulation. Moreover, non-persistent particle proxies are replaced by new particle proxies that are positioned on top of the object to be grasped. It is as if the fingers slide to the top of the object: the object literally slips out of grasp.

The conforming behavior of the persistent particle proxies described herein may enact a restorative force when an object is let go from grasp. The perceived impact of interactions with virtual objects may depend on the values of coefficients of static and kinetic friction employed in a physics-based simulation, as well as the masses and moments of inertia of the grasped virtual object. For example, the grasp of a slippery or heavy virtual object may be modeled as relatively difficult to acquire.

A persistent particle proxy algorithm according to the subject innovation includes a number of aspects. The first aspect is persistent particle proxy generation. Persistent particle proxies are generated to match the contour of the contact. In an exemplary embodiment, a user employs a 2D input surface to provide data input with regard to grasping and/or moving a 3D image of a virtual object that is displayed beneath the input surface. The 3D virtual image may be manipulated by bringing a hand or other objects in contact with the input surface. An input image of objects that contact the input surface may be processed by a Sobel (gradient) operator, which enhances the edges of the objects on the input surface to determine the position of the objects on the surface in relation to the virtual object. The position information may be used to model contact between the input object and the virtual object, although the detected position of the input object need not be displayed to the user. A particle proxy is generated for every pixel in the Sobel image that is both in contact with the virtual object and greater than some threshold intensity. As explained herein, the persistent particle proxies are used by the physics engine 404 to model physical forces that affect movement of a 3D image of the virtual object.

After persistent particle proxies are generated, they are programmatically positioned for purposes of simulation (although not necessarily displayed to a user) relative to a 3D image of a virtual object being contacted (grasped) in anticipation of simulating an interaction between the user and the virtual object. In systems having a touch screen user interface, 2D inputs may be used to determine positions for the particle proxies relative to a 3D virtual object. In one exemplary embodiment, this positioning may be performed by the particle proxy object component 502. The position of the persistent particle proxy in the plane of the display is determined naturally from the input image coordinates. The out-of-plane height of the position of the particle proxy may be determined by finding a first point of intersection with any virtual object using a raycasting operation. Raycasting is a technique for determining a first point of contact from a particular vantage point. Each persistent particle proxy may be placed for purposes of simulation to be in resting contact with the initial contact point determined by the raycasting operation.

After persistent particle proxies are positioned relative to a virtual object, the shape of each particle proxy may be determined. In exemplary embodiment, the shape of each particle proxy is determined by the persistent particle proxy component 504. The shape of each particle proxy rigid body may be a function of software designed to detect and/or model the effect of a collision (for example, a collision primitive) supported by the physics engine 404. A sphere may be used because it allows easy collision detection calculations.

Alternatively, a capsule that extends all the way from a graphics camera near the plane of the touch screen to an intersected object may be used. In an exemplary embodiment, the graphics camera and the camera used for sensing a user input are unrelated. The graphics camera may be a simulated camera used to render a 3D graphics scene in the display (e.g., eyepoint, look direction, focal length, or the like). Capsule-shaped particle proxies thus constructed may strike any object that is visible to the user if the object is rendered in accordance with the graphics camera and its associated near plane. A capsule that extends from the graphics camera to the intersected object may collide with objects that lie above the original intersecting body, such as objects that are stacked, are airborne or have sides that are not flat (e.g., a ball). The capsule proxy may provide performance that is consistent with user expectations about how objects are expected to collide with contacts.

A particle rigid body corresponding to each persistent particle proxy may be added to a physics simulation. Contact motion for each particle proxy may be computed based on historical information about the particle proxy's path (e.g., flow), followed by computing corresponding tangential motion in a scene. The computation of tangential motion refers to how motion in the plane of the touch screen (e.g., motion by a user's fingers) projects on to a 3D scene. Moreover, computation of tangential motion is done by virtue of the fact that a 2D touch screen is being used to provide input to a 3D virtual scene. In a simulation by the physics engine 404, forces may be applied to particle proxies to match motion of an object across a touch screen input device. Downward force (gravity) may be applied to particle proxies. Thereafter, the physics simulation may be updated.

According to an exemplary embodiment, persistent particle proxies desirably follow the input contour (i.e., the motion of the user's virtual contact with the virtual object), and particle proxies in a physics-based simulation are added and removed to follow the changing size and shape of the input contact. It may be desirable to move a particle proxy to match the position of a point on the contour of a contact. As an example, note the difference in size of the contours 206 and 212 shown in FIG. 2.) In order to simplify the task of tracking an evenly sampled contour over many frames, an explicit contour representation (i.e., a linked list of points) may be used rather than implicitly representing the contour by generating a particle proxy for every pixel in the Sobel image that indicates the presence of an input object.

A linked list or other collection of particle proxies corresponding to a single user input may be modeled as a single connected component for purposes of simulating motion of a virtual object. The use of the connected component concept simplifies the process of modeling the interaction of a user input with a virtual object because each connected component may be monitored as a single object during simulated motion. Multiple connected components may be used to simulate the exertion of grasping forces on the virtual object. As explained herein, the particle proxies that make up connected components may change on a frame-by-frame basis during a simulation. The contribution of physical forces represented by each particle proxy to the simulated motion of the virtual object may still be computed on a particle proxy-byparticle proxy basis even though connected components are used for purposes of tracking user inputs.

The subject innovation employs connected components to provide a contact model for persistent particle proxies. Imaging touch screens such as Microsoft Surface™ and others may be configured to use the discovery and tracking of input contacts on observing connected components in a binary image that is the result of several image processing steps such as lens distortion correction, level normalization and so on. In this binary image, each "on" pixel in a Sobel image corresponds to a tiny region of the screen that is being touched. The pixels, which may correspond to particle proxies, may be grouped together into spatially distinct connected components, which may be tracked during a simulation. Most often the center, bounding box or ellipsoid shape of each contact is made available to subsequent processing.

As set forth herein, a connected component model is used in conjunction with persistent particle proxies to ease computation. When using connected components, it is desirable to determine the contour of each connected component with precision. In an exemplary embodiment, a technique finds all connected components and their contours in one pass of an image of a 2D input surface. The use of connected components contributes the ability of an exemplary embodiment to add new contacts representing additional user inputs into the simulation. Another reason for using connected components is that a point matching process used to determine particle proxy motion may exhaustively search only the contours of tracked components, not all contours. It may be desirable to track only the components that are interacting with a virtual object for purposes of providing a physics-based simulation of movement of the virtual object.

Each connected component may correspond to a single input contact. Contacts may be tracked from frame to frame by matching the connected components found in the current frame to those found in the previous frame. A reasonable heuristic is to assign a connected component in a current frame to the nearest component in the previous frame, within some threshold distance. Components in the previous frame that have no assignment after this process are marked as removed (the contact has been lifted off). Components in the current frame that have no assignment are marked as new (the contact has just touched the surface).

The use of connected components thus allows the detection and handling of new input contacts. In particular, in the algorithm presented herein, particle proxies corresponding to new contacts are positioned in the scene using raycasting, while those associated with pre-existing contacts are not. This difference illustrates the effectiveness of the persistent particle proxy approach to simulating grasping behavior. Moreover, the use of persistent particle proxies as explained herein means that new particle proxies (representing new contacts or change in shape of an existing contact) may be modeled as appearing with their neighbors in a connected component rather than appearing on the top of a proximate visualization of a virtual object. This is because persistent particle proxies make use of position information from a previous frame rather than being defined initially in each frame, as are non-persistent particle proxies.

Exemplary embodiments relate to the use of kinematic control to correctly simulate the movement of rigid bodies under programmatic control using the physics engine 404. Kinematic control is employed to move particle proxies to match the motion of the input contact shapes. Because the inputs are provided by physical objects (e.g., fingers of the user), the inputs may be thought of as lying outside the scope of the physics simulation. Thus, the position of those objects must be determined outside of the physics simulation.

At their most basic level, rigid body physics simulators such as the physics engine 404 offer the ability to apply forces and torques to a rigid body. During the course of a simulation, setting the position of a rigid body directly (i.e., arbitrarily defining the position of an object without regard to the effects of physical principles) is generally not allowed, because this would defeat correct collision and dynamics calculations, as well as generate unrealistic object motion. Moreover, arbitrarily setting the position of a rigid body (other than defining an initial position for beginning the simulation) is undesirable because arbitrary positioning disregards model rules that contribute to realism in simulating the movement of a virtual object.

One method of emulating kinematic motion by applying only forces and torques is to apply the amounts sufficient to move the rigid body into a given position and orientation. These calculations assume the rigid body is in free space, and neglects the possibility of collisions and friction forces that might interrupt the object's motion.

Given the present (actual) position $\vec{x}$, the force F to move an object of mass m to position $\vec{x}^*$ is calculated by:

$$\vec{v}^* = \frac{\vec{x}^* - \vec{x}}{\Delta t}, \vec{a}^* = \frac{\vec{v}^* - \vec{v}}{\Delta t}, F = m\vec{a}^*.$$

According to an exemplary embodiment, it is possible to control only angular velocity. Given target angular velocity $\vec{\omega}^*$, current angular velocity $\vec{\omega}$ and moment of inertia I, applied torque may be represented as $$\vec{\tau}^* = I\frac{\vec{\omega}^* - \vec{\omega}}{\Delta t}.$$

As described herein, a contact model according to an exemplary embodiment is able to detect new contacts corresponding to new or changed user input conditions. New contacts are typically generated when the user first touches the input surface with a finger, hand or other physical object. To begin the persistent particle proxy technique, each new contact is seeded by a number of particle proxies that approximate the contour of the detected user input. Each spatially distinct set of particle proxies may be grouped into corresponding connected components. New particle proxies may be placed in the 3D scene at (x,y) coordinates to match the position of the corresponding contour point in the input image. The height (z–) of the particle proxy is determined by raycasting to find the surface in the 3D scene nearest the graphics camera. Thus, if the user touches a virtual object, the particle proxies will be positioned to lie on top of the virtual object. In an exemplary embodiment, the graphics camera is positioned to approximate the user's own eyepoint.

Existing contacts differ from new contacts in that there is a collection of particle proxies (a connected component) already created to approximate the contact's contour in the previous frame. In the persistent particle proxy technique, this set of particle proxies is updated to reflect the change in size and shape of the contact's contour from the previous frame to the current frame. In the exemplary embodiment shown in FIG. 5, this function may be performed by the persistent particle proxy component 504.

For this update, it is desirable for particle proxies to move in the same way that the corresponding part of the real object on the surface moves. This facilitates the generation of correct friction forces when the particle proxies are in contact with a virtual object, as well as to determine which parts of the contour are new or have been removed.

The motion of a given particle proxy from the previous frame to the current frame is calculated by matching a small part of the contour in the previous frame with the contour in the current frame. An exemplary embodiment may employ an exhaustive search to find the closest match in the new contour. A point $\vec{x}_{t-1,k}$ at the previous time step is matched to the point $\vec{x}_{t,j^*}$ by summing squared distance over n consecutive points of the contours:

$$j^* = \underset{j}{\operatorname{argmin}} \sum_{i=-n/2}^{n/2} \|\vec{x}_{t-1,k+i} - \vec{x}_{t,j+i}\|^2$$

According to the subject innovation, the closest matching point $\vec{x}_{t,j^*}$ on the current contour is referred to herein as the "successor" of the previous point. As this process continues around the contour, the closest match to each point in the current contour is noted with that point. Let us call the current contour point's best match point in the previous contour that point's "predecessor". Note that every point in the previous frame has a successor but not every point in the current frame may have a predecessor.

If a point on the current frame's contour was assigned a predecessor, its corresponding particle proxy is marked for reuse: it will be propagated to the next simulation time step. If the point was not assigned a predecessor, it is considered to be a new point, evidencing that the input data indicates the contact grew in size. A particle proxy is created for this point and is placed at the position of the particle proxy corresponding with the first neighboring point on the current contour not marked as new. The new particle proxy is added to the physics simulation.

Every point on the previous contour is assigned a successor on the current contour. If that successor does not consider the same point on the previous contour its predecessor, its corresponding particle proxy is marked for deletion and is removed from the physics simulation.

The result of this process is that every point on the current contour has a corresponding particle proxy in the physics simulation that is either new or reused, and each particle proxy is paired with a point on the current frame's contour in such a way as to approximate the local motion at each point of the contour.

As the last step of the algorithm, forces are applied to move the particle proxies to match the position of the paired contour point. This is performed using the technique of kinematic control described earlier, but with one distinction: a constant force is applied in the (z−) direction. Like gravity, this tends to keep the particle proxies touching the top face of some virtual object in the scene. To ensure correct friction with the particle proxies and avoid the possibility of spinning particle proxies, the angular velocity of each particle proxy is kinematically controlled to be zero.

In one exemplary embodiment of the present invention, the physics engine 404 is desirably adapted to conduct physics simulations in such a way that particle proxies are not allowed to collide with one another. Firstly, it is convenient to pack the particle proxies in more densely than what would be physically plausible (i.e., allow the particle proxies to overlap in space). This results in a smooth modeled shape. Secondly, allowing the particles to collide with one another might possibly lead to collisions and dissipation of force that is extraneous to the goal of simulating the collision and friction forces on the grasped object. The contour of particle proxies is already an unusual object from the point of view of the physics simulation. In some embodiments, there may be no practical benefit in modeling the interaction of the particles as if the contour exhibits properties of a real object like cloth.

As shown in FIG. 5, the physics engine 404 can further include a flow component 506 that can calculate a motion of a persistent particle proxy by tracking motion between a first frame and a second frame. The flow component may employ a motion estimation technique such as optical flow to estimate the motion of matching parts of a contour. Those of ordinary skill in the art will appreciate that other motion estimation techniques may be employed. Moreover, the specific motion estimation technique employed is not an essential feature of the subject innovation.

When employing persistent particle proxies, errors in the contact contour tracking process can disrupt the grasping behavior of the persistent particle proxy contour. Consider, for example, a grasping contact with its particle proxies resting on the side of an object. If the contact tracking process confuses this contact with another, it may conclude that it is a new contact, triggering the deletion or relocation of all the contour's particle proxies and the placement of new particle proxies on top of the object. The object may fall out of grasp. If there is no need to support the manipulation of objects by friction forces from the top, it may be preferable to avoid tracking connected components, and instead place all particle proxies on the "ground floor" of the scene, with the provision that new particle proxies are placed so that they do not penetrate any object.

Figure 6:
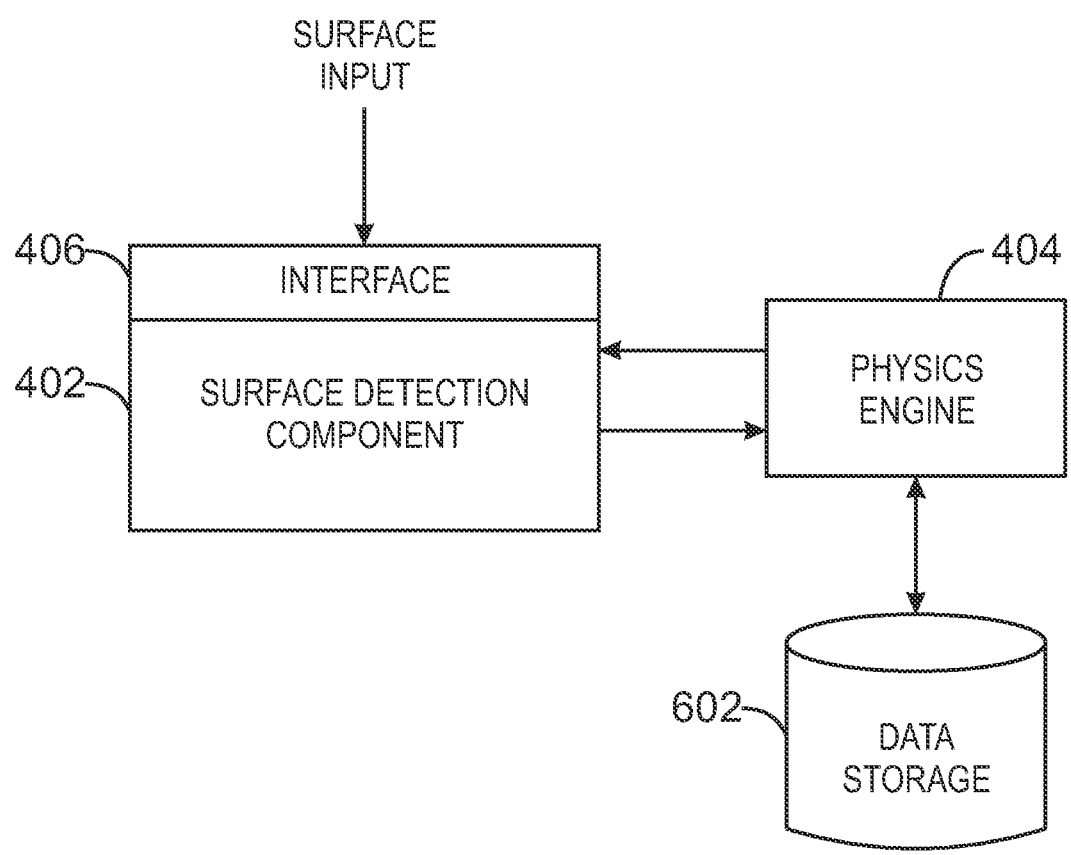
FIG. 6 is a block diagram of an exemplary system that facilitates applying physics-based principles to an interaction between a virtual object and a surface input.

FIG. 6 is a block diagram of an exemplary system 600 that facilitates applying physics-based principles to an interaction between a virtual object and a surface input. The system 600 can further include a data store 602 that can include any suitable data related to the surface detection component 402, the physics engine 404, surface input, etc. For example, the data store 602 can include, but is not limited to including, physics-based quantities, physics-based characteristics, physics-based properties, physics-based equations, user preferences, user passwords, usernames, mappings, image processing data, image processing techniques, binarization data, physics-based data, proxy object data, particle proxy data, flow data, manipulation data, etc.

It is to be appreciated that the data store 602 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM). The data store 602 of the subject systems and methods is intended to comprise, without being limited to, these and any other suitable types of memory. In addition, it is to be appreciated that the data store 602 can be a server, a database, a hard drive, a pen drive, an external hard drive, a portable hard drive, and the like.

Figure 7:
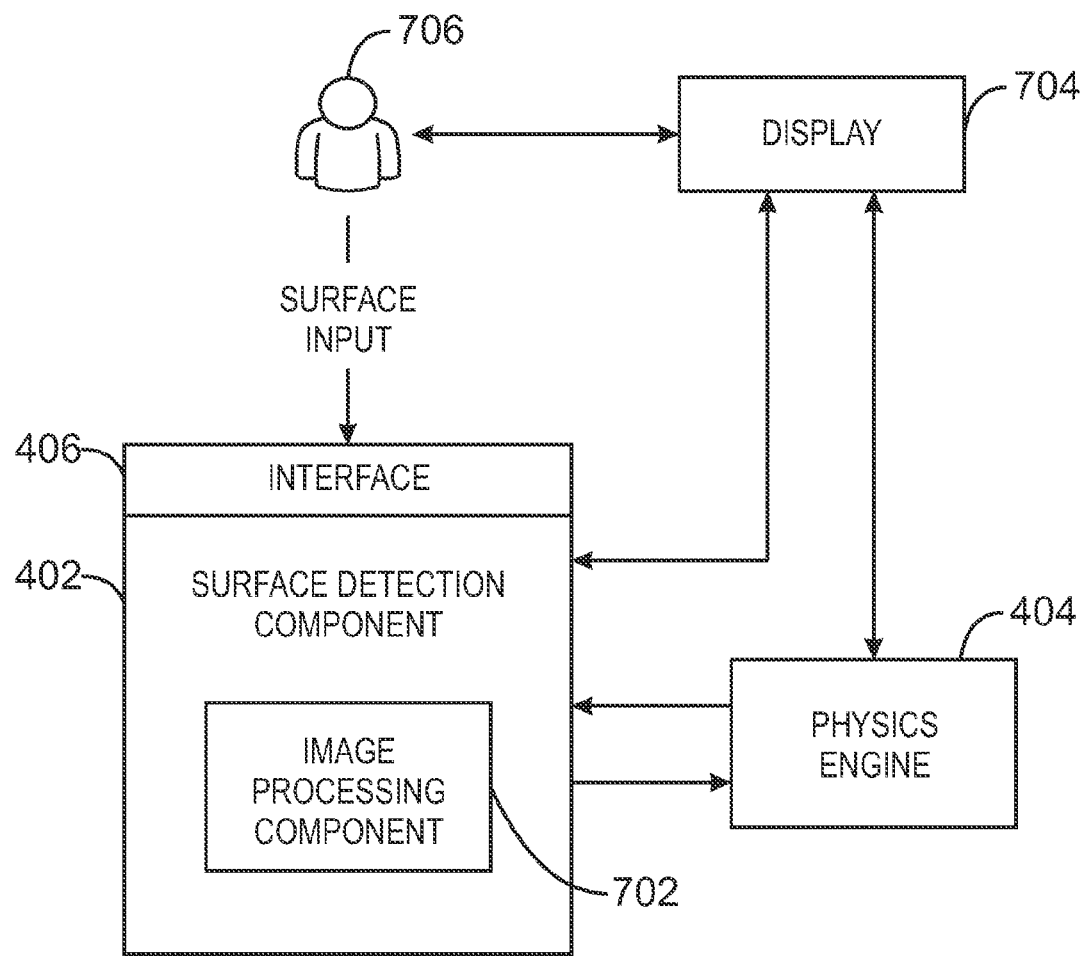
FIG. 7 is a block diagram of an exemplary system that facilitates providing enhanced surface computing for a user manipulating a virtual object.

FIG. 7 is a block diagram of a system 700 that facilitates providing enhanced surface computing for a user manipulating a virtual object. The system 700 can include an image processing component 702 that can utilize any suitable image processing technique in order to bring the collected surface input from a user 706 into alignment with a projected image on a display 704. For instance, a surface input can be detected and a corresponding point in the projected image on the display 704 can be calculated. In another example, a user's hands or fingers can be placed on a surface to which interaction with displayed data such as a virtual object can be performed. In this example, the fingers or hands can manipulate the portion of displayed data in which such data can respond with physics-accurate results (e.g., force, mass, velocity, friction, etc.). For instance, the image processing component 702 can employ binarization, image analysis, captured image analysis, etc. Moreover, it is to be appreciated that the display 704 can be any suitable display component such as, but not limited to, a monitor, a television, a liquid crystal display (LCD), a plasma, a rear-projection display, a front-projection display, a cathode ray tube (CRT) monitor, a flat-panel, a display for a computing device, a portable digital assistance (PDA) screen, a laptop display, a computer monitor, a smartphone display, a cellular device screen, a mobile communication device display, a portable gaming device display, etc.

Figure 8:
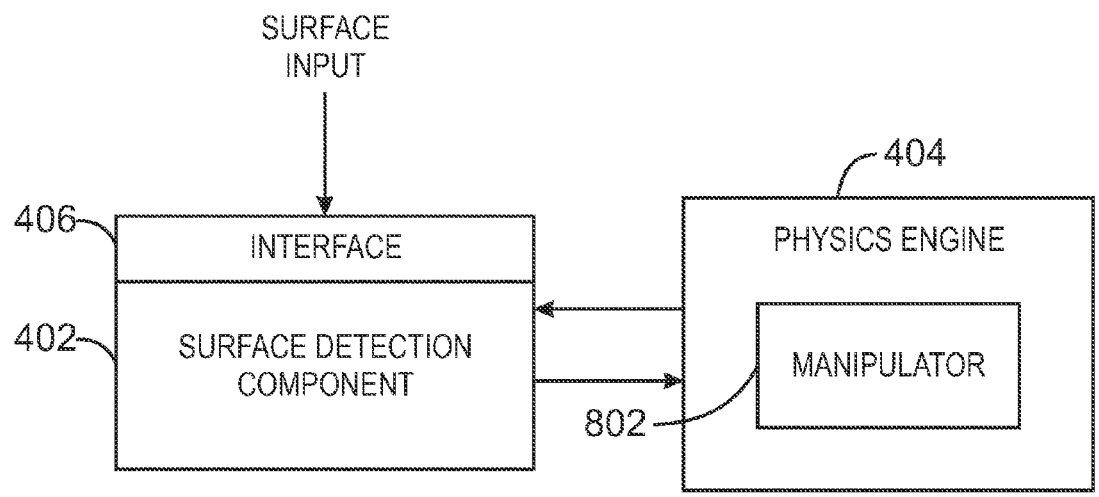
FIG. 8 is a block diagram of an exemplary system that facilitates enabling manipulation styles for surface technologies.

FIG. 8 is a block diagram of a system 800 that facilitates enabling manipulation styles for surface technologies. The system 800 includes a physics engine 404 that has a manipulator 802. The manipulator 802 can provide at least one of a manipulation fidelity, a gathering, a manipulation of a 3-dimensional (3D) object, or a rigidity simulation. By providing more detailed surface input types into a physics simulation and more realistic grasping behavior, the subject innovation can enable a wide variety of manipulation styles drawn from real-world experience. The claimed subject matter can provide at least one of manipulation fidelity, gathering, manipulating objects in 3D, cloth and soft bodies.

The manipulator 802 can provide the ability to sense and process contours, as well as distribute friction forces piecewise across the virtual space, which enables the manipulation of two or more objects at once, much as one might move a group of small objects spread across a table or surface. Users may use the edges of their hands (e.g., or even arms) to collide against many objects at once, or use the flats of multiple hands to apply friction forces. For interactive surfaces able to sense physical objects, an interesting possibility is to use a ruler or any other straight edged object to move and align multiple objects.

Modeling virtual objects and input in 3D enables interesting yet familiar interactions. For example, a small flat object resting on a larger flat object may be moved by tapping its side or applying friction. Depending on the masses and frictions involved, the larger object may be held in place. Clearly, the designer can tune masses, frictions and appearances to match the user's expectations with the manipulator 802.

Rigid bodies such as boxes, spheres, and the like can explain the described interaction techniques. However, in the real world objects may not be rigid; instead, they can be soft, malleable, and can deform or dissolve upon force exertion. Examples can include, but are not limited to including, rubber, clothes, paper, plastics, soft metals, etc.

In addition to rigid body dynamics, the manipulator 802 can provide physics simulations that offer some form of support for soft body, cloth, and/or fluid simulation. As all interactions in the model associated with the claimed subject matter are conducted through collision or friction forces, it can be applied to arbitrary virtual objects. For example, it is possible to crumple a piece of cloth with a grasping interaction using all the fingers of one hand. That crumpled cloth can then be straightened by pushing down with the flat hand. One can even tear paper-like objects apart by applying forces in opposing directions on two corners.

Moreover, the manipulator 802 can allow soft volumetric bodies to be squished so as to fit into cavities or compressed so as to slide underneath other objects. Soft materials could also be used for terrains; deformation could be triggered by users digging their fingers into the terrain, using their whole hands to form valleys, or using a cupping gesture to create elevations. More open-ended and free-form interactions with particle systems (e.g., simulating sand) and fluids can be further provided (e.g., in a gaming context, etc.).

Figure 9:
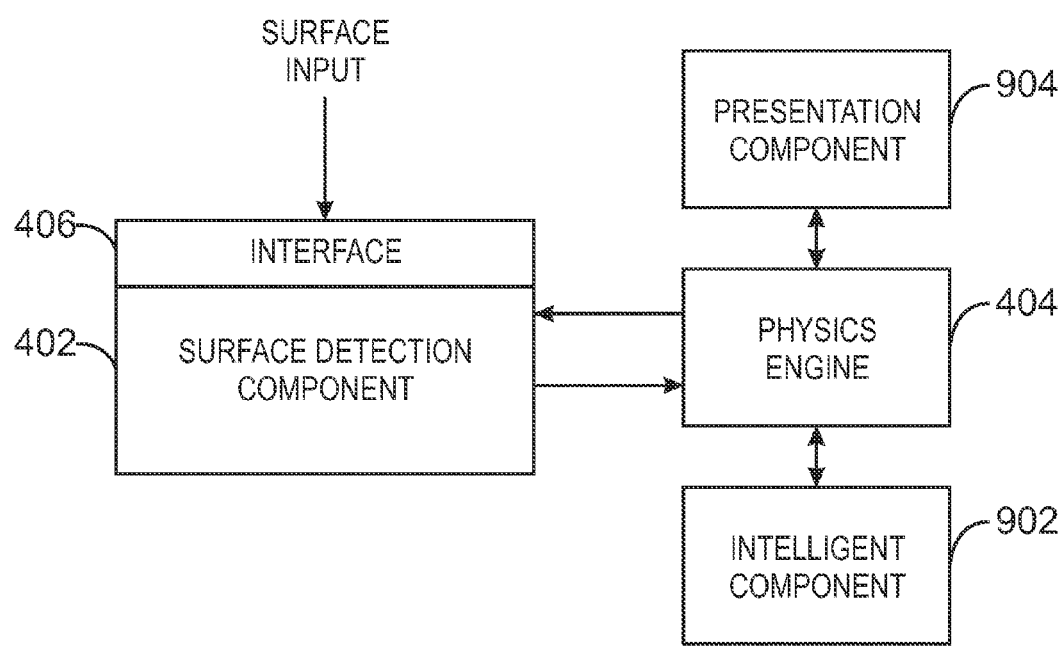
FIG. 9 is a block diagram of an exemplary system that facilitates incorporating physics-based principles into surface computing and data interaction.

FIG. 9 is a block diagram of a system 900 that employs intelligence to facilitate automatically incorporating physics-based principles into surface computing and data interaction. The system 900 can include the surface detection component 402, the physics engine 404, and the interface component 406, which can be substantially similar to respective engines, components, and interfaces described in previous figures. The system 900 further includes an intelligent component 902. The intelligent component 902 can be utilized by the physics engine 404 to facilitate incorporating physics-based principles and related properties to data interactions in connection with surface computing. For example, the intelligent component 902 can infer mass, force, velocity, friction, proxy objects, particle proxy, velocity calculations, data interactions, etc.

The intelligent component 902 can employ value of information (VOI) computation in order to identify quantities for object represented by displayed data. For instance, by utilizing VOI computation, the most ideal and/or appropriate physics properties can be identified and enforced. Moreover, it is to be understood that the intelligent component 902 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The physics engine 404 can further utilize a presentation component 904 that provides various types of user interfaces to facilitate interaction between a user and any component coupled to the physics engine 404. As depicted, the presentation component 904 is a separate entity that can be utilized with the physics engine 404. However, it is to be appreciated that the presentation component 904 and/or similar view components can be incorporated into the physics engine 404 and/or a stand-alone unit. The presentation component 904 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the physics engine 404.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 10:
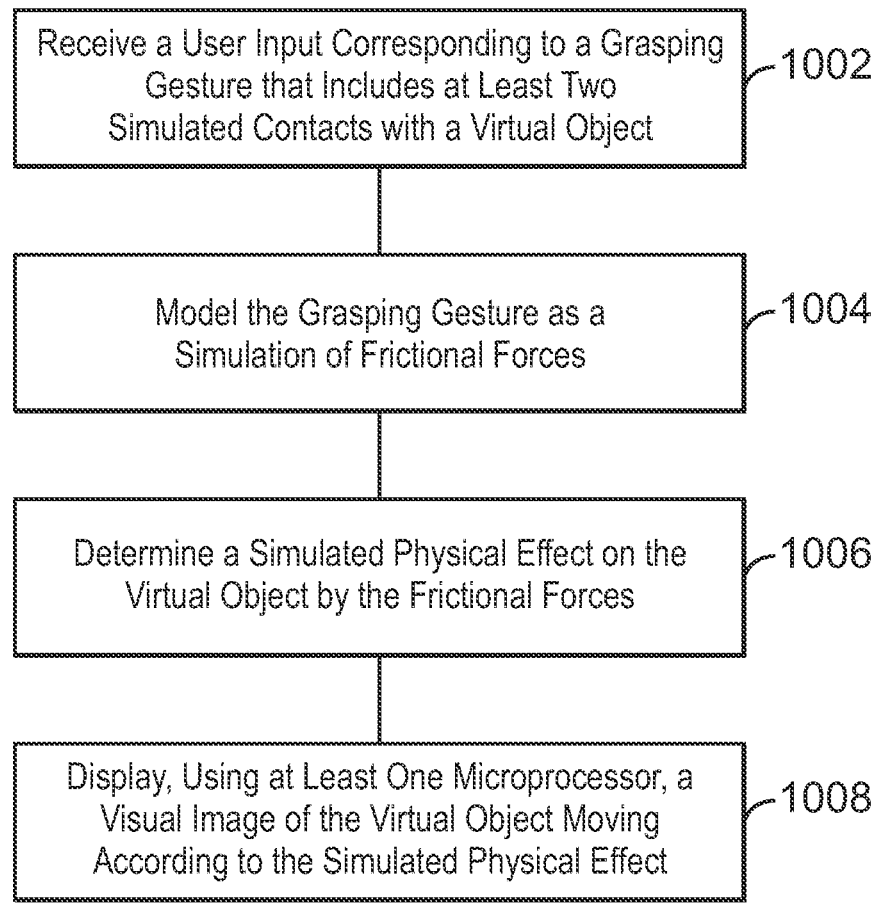
FIG. 10 is a block diagram of an exemplary method for simulating grasping of a virtual object.
Figure 11:
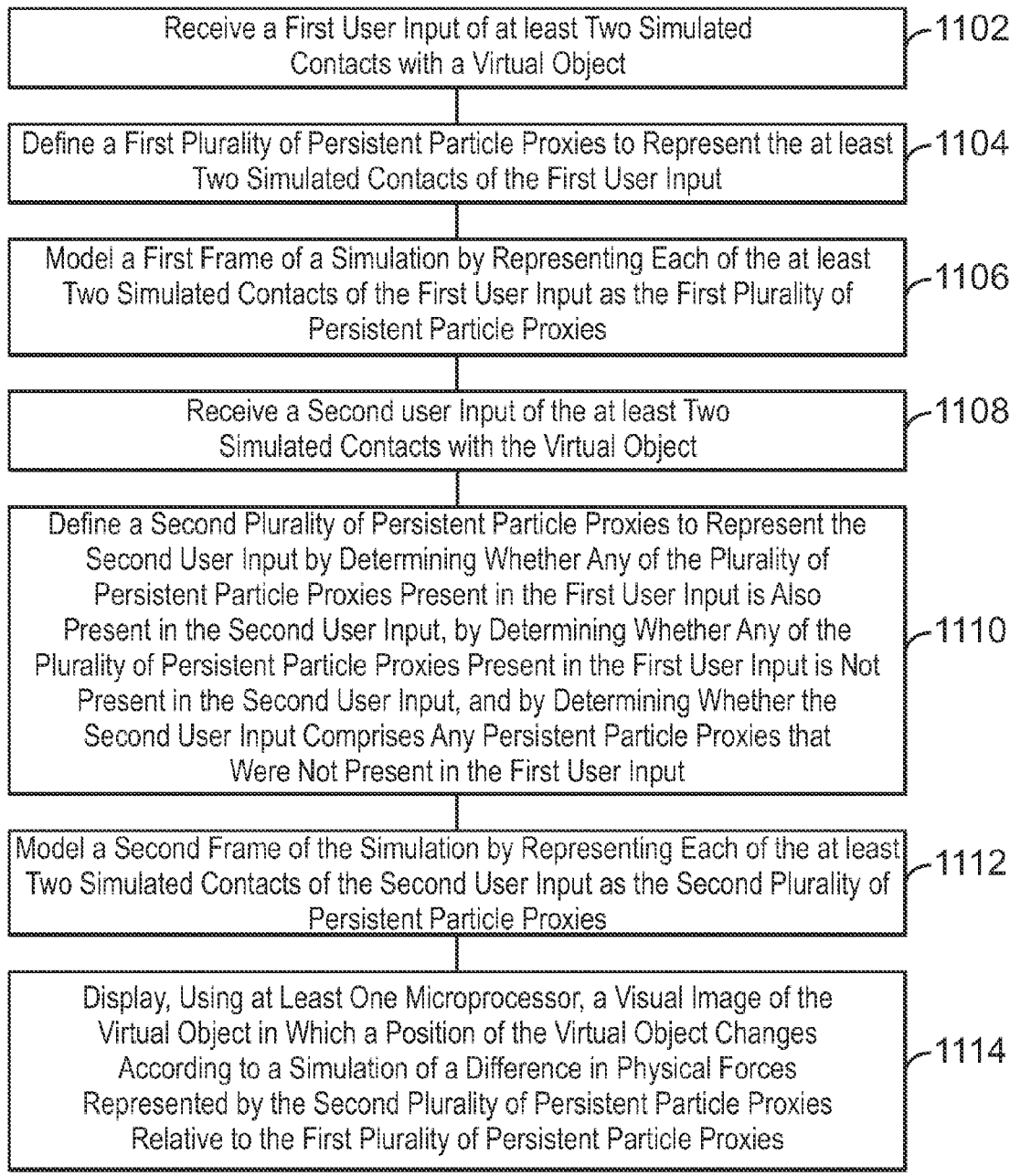
FIG. 11 is a block diagram of an exemplary method for simulating motion of a virtual object.

FIGS. 10-11 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

FIG. 10 is a block diagram of an exemplary method 1000 for simulating grasping of a virtual object. The method 1000 may be performed by the system 400. The method 1000 employs persistent particle proxies to simulate grasping of a virtual object, as explained herein.

At block 1002, a user input corresponding to a grasping gesture that includes at least two simulated contacts with the virtual object is received. The grasping gesture is modeled as a simulation of frictional forces, as shown at block 1004. As set forth herein, persistent particle proxies are useful for simulating grasping of a virtual object because their persistence allows the physics engine 404 to model a normal force on the side of a virtual object for each persistent particle proxy.

Those of ordinary skill in the art will appreciate that any suitable image processing technique can be utilized in order to bring the collected surface input from a user into alignment with a projected image of a virtual object on a display. For instance, a surface input can be detected and a corresponding point in the projected image on the display can be calculated. In another example, a user's hands or fingers can be placed on a surface to which interaction with displayed data can be performed. In this example, the fingers or hands can manipulate the portion of displayed data in which such data can respond with physics-accurate results (e.g., force, mass, velocity, friction, etc.).

The persistent particle proxies can be mapped to any suitable detected user input, wherein data relating to the input can be incorporated into a physics simulation. The persistent particle proxies can be created and positioned for each point of contact (e.g., surface input, detected gestures, movement, etc.). It is to be appreciated that the proxy object can enable collision with objects resting on the same plane as the touched object (e.g., the floor) but also objects that are in mid-air or stacked on other objects, etc.

A simulated physical effect on the virtual object by the frictional forces is determined, as shown at block 1006. The virtual object may be moved according to the simulated physical effect. At block 1008, one or more microprocessors is used to display a visual image showing the movement of the virtual object.

FIG. 11 is a block diagram of an exemplary method 1100 for simulating motion of a virtual object. The system 400 may perform the method 1100. A first user input is received, as shown at block 1102. The first user input represents at least two simulated contacts with a virtual object. Thus, the first user input may represent a grasping gesture. At block 1104, a first plurality of persistent particle proxies is defined to represent the first user input. A first frame of a simulation may be modeled by representing each of the at least two simulated contacts of the first user input as the first plurality of persistent particle proxies, as shown at block 1106.

At block 1108, a second user input of at least two simulated contacts with the virtual object is received. The second user input is used to define a second plurality of persistent particle proxies, as shown at block 1110. As set forth herein, the second plurality of persistent particle proxies is defined by comparing the first user input with the second user input.

Persistent particle proxies that are present in both the first and second user inputs are reused, while a subset of the initial group of persistent particle proxies that is no longer present in the second user input are no longer needed to simulate the motion of the virtual object. Persistent particle proxies are added for areas of the virtual object that are newly touched in the second user input (i.e., areas that are not touched in the first user input).

In an exemplary embodiment, the creation of the second plurality of persistent particle proxies includes a determination of whether any of the plurality of persistent particle proxies present in the first user input is also present in the second user input. Persistent particle proxies present in both sets of user input will be included in the second plurality of persistent particle proxies for modeling a second frame of the simulation. It may also be determined whether any of the plurality of persistent particle proxies present in the first user input is not present in the second user input. Persistent particle proxies not in the second user input will not be included in the second plurality of persistent particle proxies, and therefore, will not be used in the second frame of the simulation. It may also be determined whether the second user input comprises any persistent particle proxies that were not present in the first user input. If new persistent particle proxies are present in the second user input, they will be included in the second plurality of persistent particle proxies and used to produce the second frame of the simulation.

As shown at block 1112, the second frame of the simulation is modeled by representing each of the at least two simulated contacts of the second user input as the second plurality of persistent particle proxies. The virtual object may be moved according to a simulation of a difference in physical forces represented by the second plurality of persistent particle proxies relative to the first plurality of persistent particle proxies. A visual image showing movement of the virtual object is displayed using one or more microprocessors, as shown at block 1114. Moreover, the visual image shows a change in a position of the virtual object from a first frame to a second frame.

Figure 12:
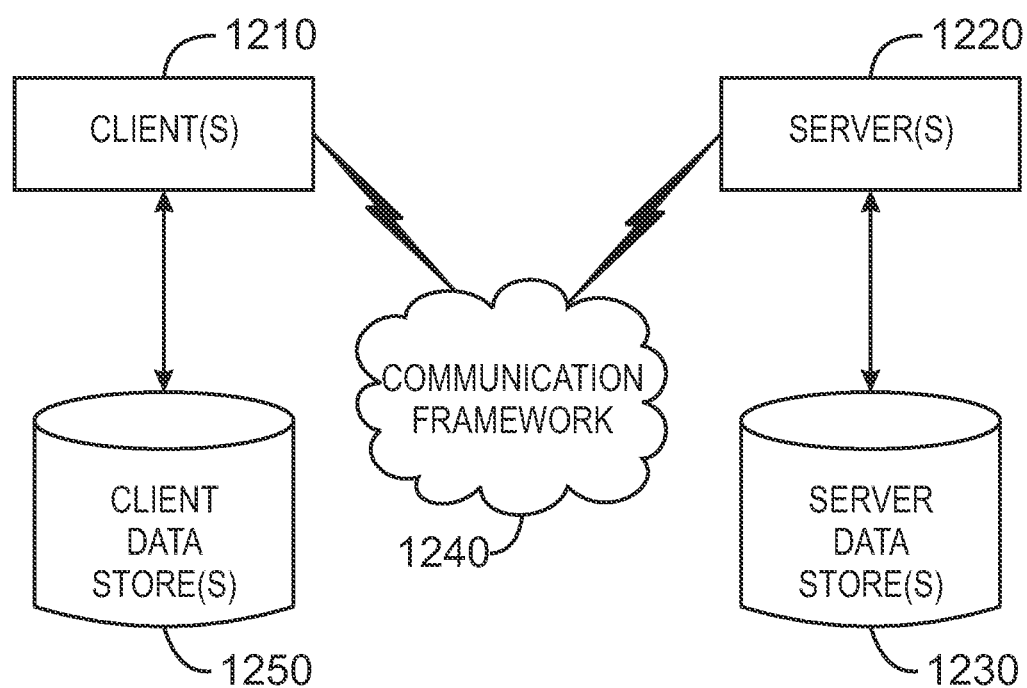
FIG. 12 is a block diagram of an exemplary networking environment, wherein aspects of the claimed subject matter can be employed.
Figure 13:
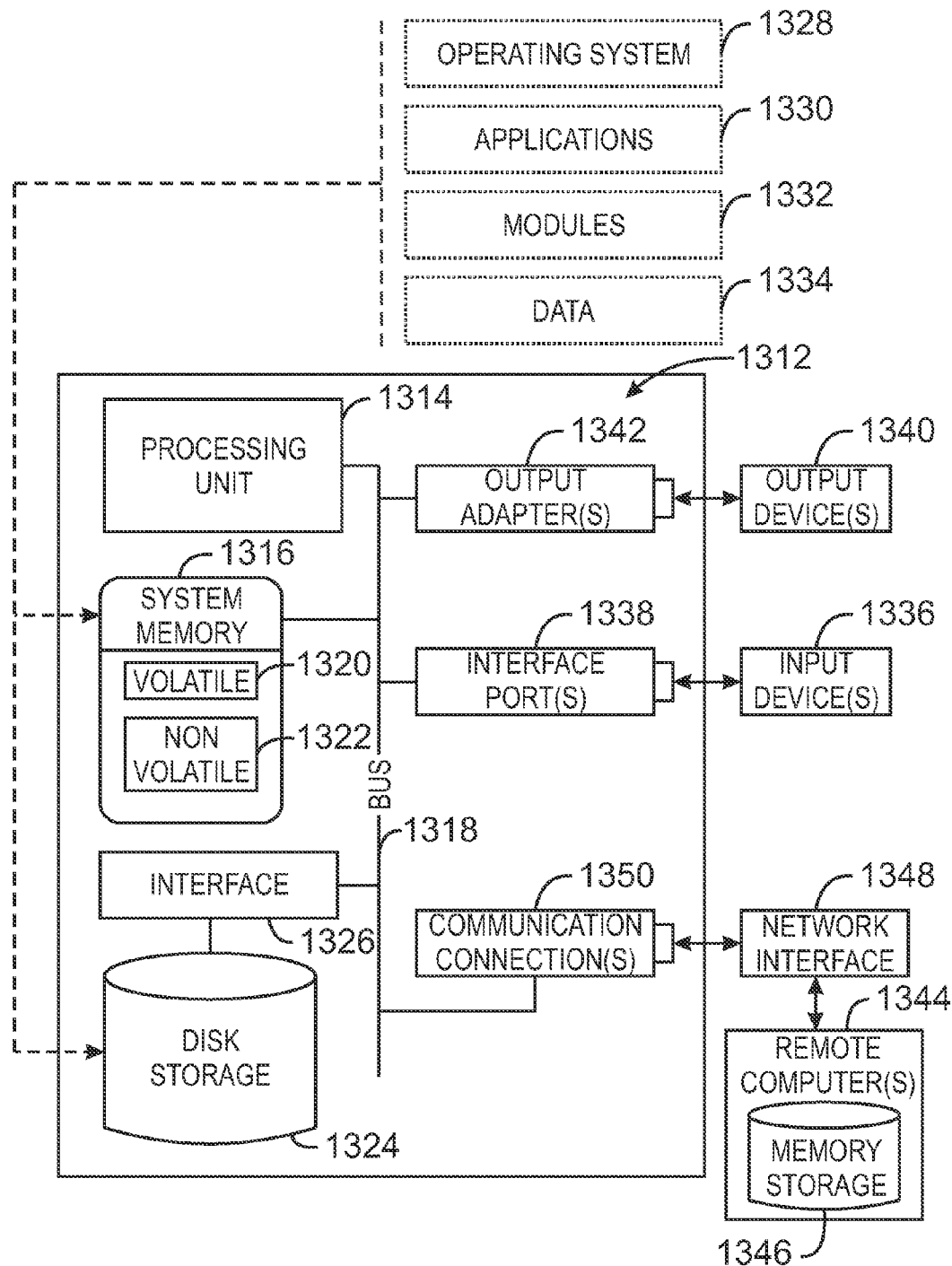
FIG. 13 is a block diagram of an exemplary operating environment that can be employed in accordance with the claimed subject matter.

In order to provide additional context for implementing various aspects of the claimed subject matter, FIGS. 12-13 and the following discussion is intended to provide a brief, general description of a suitable computing environment in which the various aspects of the subject innovation may be implemented. For example, a physics engine that can incorporate a realistic simulation of grasping a virtual object, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 12 is a schematic block diagram of a sample-computing system 1200 with which the claimed subject matter can interact. The system 1200 includes one or more client(s) 1210. The client(s) 1210 can be hardware and/or software (e.g., threads, processes, computing devices). The system 1200 also includes one or more server(s) 1220. The server(s) 1220 can be hardware and/or software (e.g., threads, processes, computing devices). The servers 1220 can house threads to perform transformations by employing the subject innovation, for example.

One possible communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the servers 1220.

With reference to FIG. 13, an exemplary environment 1300 for implementing various aspects of the claimed subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), or flash memory. Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 1312 also includes removable/non-removable, volatile/non-volatile computer storage media. FIG. 13 shows, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. In addition, the input devices 1336 may include devices that are specifically configured to receive inputs that allow a user to simulate the grasping of a virtual object. Examples of such devices include a touch pad, a touch screen and/or the like. The input devices 1336 connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to the computer 1312, and to output information from computer 1312 to an output device 1340. Output adapter 1342 is provided to illustrate that there are some output devices 1340 like monitors, speakers, and printers, among other output devices 1340, which are accessible via adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

The computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to the computer 1312. For purposes of brevity, only a memory storage device 1346 is illustrated with remote computer(s) 1344. Remote computer(s) 1344 is logically connected to the computer 1312 through a network interface 1348 and then physically connected via a communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to the computer 1312. The hardware/software for connection to the network interface 1348 may include, for exemplary purposes only, internal and external technologies such as, modems including regular telephone grade modems, cable modems and DSL modems, ISDN adapters, and Ethernet cards.

An exemplary embodiment of the computer 1312 may comprise a diffuse-illuminated interactive tabletop system similar to Microsoft Surface™. The system may employ a single video camera that runs at 60 Hz, with images of resolution 640×480. The camera may be mounted under a display surface and may collect an image of objects in contact with the display surface. An exemplary system employs a table that projects a 1024×768 image onto a 30″ diagonal display. Those of ordinary skill in the art will appreciate that numerous techniques may be employed to correct for lens distortion, projective distortion, level normalization and binarization.

An exemplary system may be driven by a desktop PC with a known processor, such as an Intel® Core i7 CPU. In such an exemplary embodiment that employs particle proxies as described herein, CPU consumption may increase as more particle proxies are added. An exemplary contour matching process may be quadratic (i.e., vary exponentially) in the number of points on the contour. By way of example, if there are n points on a contour curve at a first frame and n points in the next frame, a naïve implementation of the matching process could match each of the n points from the first frame to each of the n points in the second frame. In that case, the time it would take to do this would be proportional to $n^2$. Those of ordinary skill in the art will appreciate that the frame rate of the overall system may dip below the camera frame rate when there are many contacts or large contacts. It may be possible to address this issue using multithreading or otherwise optimizing software to perform as described herein.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method of simulating grasping of a virtual object, comprising:
receiving a user input corresponding to a simulated grasping gesture that includes at least two simulated contacts with the virtual object, the simulated grasping gesture comprising a simulated application of multiple persistent contacts on two or more places on a virtual object, the virtual object comprising at least a three-dimensional virtual object, and the user input comprising a two-dimensional (2D) input;
modeling the simulated grasping gesture as a simulation of frictional forces on the virtual object by representing the multiple persistent contacts on two or more places on the virtual object as exerting normal forces that persist on the object, the normal forces being proportional to an incursion of one or more of the multiple persistent contacts within the virtual object on the two-dimensional (2D) input;
determining a simulated physical effect on the virtual object by the frictional forces so that the virtual object is modeled as behaving as though grasped at the two or more places on the virtual object, wherein behaving as though grasped at the two or more places comprises moving the virtual object to restore mechanical equilibrium when the simulated contacts move; and
displaying, using at least one microprocessor, a visual image of the virtual object moving according to the simulated physical effect.

2. The computer-implemented method recited in claim 1, wherein each of the at least two simulated contacts is represented as a contour that corresponds to an area of interaction between an input object and the virtual object.

3. The computer-implemented method recited in claim 1, wherein each of the at least two simulated contacts is modeled as a connected component.

4. The computer-implemented method recited in claim 1, wherein the simulation of physical effect comprises at least one of a force, a mass, a velocity or a friction.

5. The computer-implemented method recited in claim 1, comprising modeling a subsequent user input by determining whether persistent particle proxies corresponding to the at least two contacts are still present in the subsequent user input.

6. The computer-implemented method recited in claim 5, comprising determining whether the subsequent user input comprises additional persistent particle proxies.

7. The computer-implemented method recited in claim 5, comprising:
determining a subset of the plurality of persistent particle proxies that no longer has an effect on movement of the virtual object; and
removing the subset of the plurality of persistent particle proxies from further simulation.

8. The computer-implemented method recited in claim 5, wherein each of the at least two simulated contacts is modeled as a stack of persistent particle proxies.

9. The computer-implemented method recited in claim 1, wherein displaying the visual image comprises displaying the visual image of the virtual object moving according to the simulated physical effect.

10. A system that facilitates a simulated interaction of an input object with a virtual object, comprising:
a detection component that detects multiple inputs by the input object, the multiple detected inputs enabling a simulated physical interaction of the multiple detected inputs with the virtual object, the input object comprising a two-dimensional input, the virtual object comprising a three-dimensional object, wherein the simulated physical interaction comprises grasping the virtual object by the sides and rotating the virtual object; and
a physics engine that models each of the multiple detected inputs as persistent particle proxy objects to employ physics-based principles into the simulated interaction with the virtual object in order to model an effect of at least one of a force, a mass, a velocity or a friction on the virtual object, wherein the persistent particle proxy objects are modeled as exerting a normal force on two or more surfaces of the virtual object, the effect being proportional to an incursion of one or more of the multiple detected inputs within the virtual object on the input object, and the persistent particle proxy objects being modeled as behaving as though the virtual object is grasped at the two or more surfaces on the virtual object, wherein behaving as though the virtual object is grasped at the two or more surfaces comprises moving the virtual object to restore mechanical equilibrium when at least two of the persistent particle proxy objects move.

11. The system recited in claim 10, wherein each of the multiple detected inputs is represented as a contour that corresponds to an area of interaction between an input object and the virtual object.

12. The system recited in claim 10, wherein a subsequent user input is modeled by determining whether persistent particle proxy objects corresponding to the at least two contacts are still present in the subsequent user input relative to an initial user input.

13. The system recited in claim 12, wherein the subsequent user input is modeled by determining whether the subsequent user input encompasses additional persistent particle proxy objects relative to an initial user input.

14. The system recited in claim 13, wherein the subsequent user input is modeled by determining a subset of the persistent particle proxy objects that no longer has an impact on the virtual object and wherein the subset of the persistent particle proxy objects that no longer have an impact on the virtual object is no longer used in further simulation of interaction with the virtual object.

15. A computer-implemented method of simulating motion of a virtual object, comprising:
  receiving a first user input of at least two simulated contacts with the virtual object;
  defining a first plurality of persistent particle proxies to represent the at least two simulated contacts of the first user input;
  modeling a first frame of a simulation by representing each of the at least two simulated contacts of the first user input as the first plurality of persistent particle proxies, and by representing the first plurality of persistent particle proxies as exerting normal forces that persist on the virtual object, the normal forces being proportional to an incursion of one or more of the first plurality of persistent particle proxies within the virtual object on the two-dimensional inputs so that the virtual object is modeled as behaving as though it is grasped at the at least two simulated contacts on the virtual object;
  receiving a second user input of at least two simulated contacts with the virtual object, the first user input and the second user input corresponding to a grasping gesture comprising a simulated application of multiple persistent contacts on two or more surfaces of a virtual object, the virtual object comprising at least a three-dimensional virtual object, the first user input and the second user input comprising two-dimensional inputs;
  defining a second plurality of persistent particle proxies to represent the second user input by determining whether any of the plurality of persistent particle proxies present in the first user input is also present in the second user input, by determining whether any of the plurality of persistent particle proxies present in the first user input is not present in the second user input, and by determining whether the second user input comprises any persistent particle proxies that were not present in the first user input;
  modeling a second frame of the simulation by representing each of the at least two simulated contacts of the second user input as the second plurality of persistent particle proxies, and by representing the second plurality of persistent particle proxies as exerting normal forces that persist on the virtual object, the normal forces being proportional to an incursion of one or more of the second plurality of persistent particle proxies within the virtual object on the two-dimensional inputs so that the virtual object is modeled as behaving as though it is grasped at the at least two simulated contacts, wherein behaving as though grasped at the at least two simulated contacts comprises moving the virtual object to restore mechanical equilibrium when the at least two simulated contacts move; and
  displaying, using at least one microprocessor, a visual image of the virtual object in which a position of the virtual object changes according to a simulation of a difference in physical forces represented by the second plurality of persistent particle proxies relative to the first plurality of persistent particle proxies, wherein the position of the virtual object changes in response to a simulation of grasping the virtual object by the sides and rotating the virtual object in place.

16. The computer-implemented method recited in claim 15, comprising using a raycasting operation to determine a location on the virtual object for the persistent particle proxies that are present in the second user input but not the first user input.

17. The computer-implemented method recited in claim 9, wherein the simulated physical effect comprises grasping the virtual object by the sides and rotating the virtual object in place.

* * * * *